United States Patent Office 3,634,563
Patented Jan. 11, 1972

3,634,563
METHOD FOR THE MANUFACTURE OF INORGANIC THERMAL INSULATION
Joseph J. Asbury, Knoxville, and John M. Googin, Oak Ridge, Tenn., assignors to the United States of America as represented by the United States Atomic Energy Commission
No Drawing. Filed Mar. 13, 1970, Ser. No. 19,486
Int. Cl. B29d 27/08; C04b 21/06
U.S. Cl. 264—44
8 Claims

ABSTRACT OF THE DISCLOSURE

This invention relates to an inorganic thermal insulating product of a density less than 25 pounds per cubic foot and a thermal conductivity factor of less than 0.5 B.t.u.-in./ft.$^2$-hr.-° F. at a temperature of 1500° C. The product is prepared by mixing minute silicon oxide particles with inorganic fibers, an organic liquid which wets the surface of the particles and inhibits crystallization and hydration of the particles, and a quantity of octanoic acid. The organic liquid and a portion of the octanoic acid are evaporated, with the remaining octanoic acid being retained. The mixture is ground and then pressed into a desired configuration of essentially final dimensions, with the octanoic acid flowing during the pressing step to act as a binder for the silicon oxide particles. After pressing the compact is lightly sintered in an inert atmosphere during which virtually all, if not all, of the remaining octanoic acid volatilizes.

---

The present invention relates generally to thermal insulation, and more particularly to a method of producing inorganic thermal insulating material which is readily formed in a preselected configuration and which has a density of less than 25 pounds per cubic foot and a thermal conductivity factor of less than 0.5 B.t.u.-in./ft.$^2$-hr.-° F. at 1500° C. This invention was made in the course of, or under, a contract with the U.S. Atomic Energy Commission.

High temperature applicants necessitate the employment of thermal insulation which adequately protects temperature-sensitive components from heat damage. In aerospace systems the thermal insulation must also be of a relatively light weight and possess sufficient structural integrity to withstand stresses encountered by such systems in operation. Carbonaceous insulation, e.g., carbon foam, and fibrous insulation employing carbon binders have desirable thermal insulating properties and possess adequate strength and low density for use in aerospace systems. However, carbon bonded insulators are somewhat restricted to use in reducing or neutral atmospheres at higher temperatures since at such temperatures the carbon will "burn out" in the presence of oxygen. Oxidation-resistant thermal insulation would be preferred, but previous efforts were not satisfactory due to difficulties in preparing the insulator in a desired configuration with close tolerances which require little, if any, machining to final dimensions. The use of organic binders in inorganic insulators facilitated the shaping of the insulator and provided strength to the latter, but the binder suffered problems similar to the aforementioned carbon bonded insulators and also provided a mode of thermal conduction which increases the thermal conductivity of the insulator.

It is an object of the present invention to obviate or substantially minimize the above and other shortcomings or drawbacks by providing a relatively rigid, formed, thermal insulator of oxidation-resistant materials, with the insulator being of a density less than about 25 pounds per cubic foot (p.c.f.) and possessing a thermal conductivity factor (K) of about 0.5 B.t.u.-in./ft.$^2$-hr.-° F. at 1500° C. The insulator of the present invention is manufactured by preparing a slurry of fine oxide powder, e.g., silica powder (100–150 angstrom particle size), glass, quartz, or oxide fibers, a surface wetting agent for facilitating the handling and reduction in volume of the fine silica powder, and an organic acid, say, octanoic. The slurry is subjected to a drying step which causes the wetting agent and a portion of the acid to volatilize. The mixture is ground and then pressed into the desired configuration during which the remaining acid flows or migrates and provides a pressing aid for binding together the silica particles. After pressing, the shaped insulator is sintered with virtually, if not entirely, all of the remaining acid being volatilized.

Another object of the present invention is to provide a new and improved oxidation resistant thermal insulation capable of being formed in complex shapes to close tolerances so as to effectively eliminate machining which was heretofore found to be difficult and frequently destructive of the insulation.

Other and further objects of the invention will be obvious upon an understanding of the illustrative embodiment about to be described, or will be indicated in the appended claims, and various advantages not referred to herein will occur to one skilled in the art upon employment of the invention in practice.

Described generally, the present invention relates to a ceramic particulate and fiber system which is die formed and sintered to dimension for forming a shaped thermal insulator of a density less than 25 p.c.f. In the preparation of the thermal insulator, particulate silica is admixed with glass, quartz, or oxide fibers and two surface wetting agents, one of which provides a thixotropic-like system and functions as a binder or matrix during the die forming or pressing operation. The slurry resulting from this admixture is heated to remove the wetting agents except for a portion of the one providing the binder. The mixture is die formed to the desired shape and tolerance and then lightly sintered to maintain the configuration.

The thermal insulator is primarily formed of oxide particulates. These particulates are preferably silicon oxide of a size in the range of about 100–150 angstroms. This form of silicon oxide is very fluffy and extremely hard to handle in its dry, powder form. This fluffiness is exemplified by a density of about 0.038 g./cc.

The handling of the fluffy silicon oxide power is facilitated by employing a surface wetting agent which preserves the silicon oxide particle surfaces while enabling the fine fluffy powder to be reduced to a volume that can be handled and worked effectively without adversely affecting the physical properties and thermal conductivity of the insulator. A moderately volatile, slightly polar acidic organic compound is preferred as the wetting agent. Esters, ethers, and ketones of higher volatility provide suitable co-wetting agents. For example, ethyl acetate is highly volatile and functions very satisfactorily as the silicon oxide wetting agent. The thermal insulating properties of the silica are retained by using such surface wetting agents since they prevent crystallization or hydration of the silica, which conditions adversely affect the thermal insulating properties of the pressed and sintered product.

As briefly mentioned above, the binder employed in the formation of the insulator is also a surface wetting agent. Octanoic acid forms a thixotropic-like system with the oxide particulates in that the acid flows under the influence of pressure and has been found to provide a unique function in the formation of the thermal insulator in that, while providing a binder for holding the powders together during the pressing operation, it also functions as a lubricant for enhancing the pressing of the powders. Upon "drying" the slurry with the wetting agents therein as above described, the portion of the octanoic acid remaining is uniformly dispersed throughout the mass of silicon oxide and upon application of the stress during the pressing operation the octanoic acid flows to function as the binder and lubricant or pressing aid for the pressing operation. Once the pressing is completed and the stress removed, the octanoic acid-silicon system again returns to a gelatinous state. The octanoic acid remaining in the pressed compact is virtually, if not entirely, volatilized during the sintering of the compact, as will be discussed below.

The octanoic acid could be used alone with the silicon oxide powder, but the other wetting agents such as described above assist markedly in reducing the volume of the powder. The octanoic acid is necessarily less volatile than the other wetting agents since these other wetting agents are preferably volatilized once their function of aiding in reducing the volume of the silicon oxide powders is completed. However, it is necessary that a portion of the octanoic acid remain to provide the aforementioned lubricant and binder for employment in the pressing operation. The proportion of the octanoic acid remaining is not critical when less than the free volume in the pressed object, but should be sufficient to provide an adequate lubricant and binder for retaining the powders in the shaped configuration until the pressing and sintering steps are completed.

While octanoic acid is preferably employed in the process of the present invention, it is to be understood that other acids having approximately the same melting point, vapor pressure, and thermal stability may be used. For example, other fatty acids having medium volatility ranges such as heptanoic and nonanoic may be successfully employed.

The addition of a quantity of inorganic fibers to the insulator functions to increase or retain the strength of the shaped structure. Fibers of a material such as silicon oxide, $ZrO_2$, asbestos, $Al_2O_3$, TiO, and any other refractory-like materials which are relatively poor heat conductors are satisfactory for this purpose. These fibers are preferably about 0.5 to 1.5 inches in length and about 10 mils in diameter. The quantity of fibers employed in the insulator is preferably about 1 to 10 weight percent. Also useable in the insulator is a material such as titanium oxide powder which reduces or reflects infrared and thermal radiation. Normally, about 2 to 4 weight per cent titanium oxide powder of a size less than 325 mesh (Tyler) is sufficient.

After combining the insulator ingredients, the slurry is mixed thoroughly and then dried to effect the volatilization of the wetting agents except for a small quantity of octanoic acid. "Drying" of the mixture may be readily accomplished by spreading it out as a thin layer at room temperature. Normally, about 36 hours are required to effect the desired volatilization. If desired, a faster rate of volatilization may be obtained by heating the mixture, but care should be exercised to assure that an excessive quantity of octanoic acid will not be removed.

The pressing of the insulator may be accomplished by using simple, conventional die forming type presses which are adequate to fabricate various tubulations, receptacles, and other desired shapes. The pressure or stress employed in the pressing operation must be sufficient to liquefy the octanoic acid particles. For example, a pressure corresponding to a stress in the range from about 500 p.s.i. up to about 3000 p.s.i. has been found to be satisfactory. Normally, this pressing operation is maintained for a duration of about a minute or less, but, if desired, it can be completed in either a longer or shorter period of time without adversely affecting the properties or integrity of the insulator.

Upon completing the pressing of the insulator it is lightly sintered to assure its integrity. This sintering may be achieved by heating the pressed compact to a temperature from about 800° C. up to 1000° C. and maintaining the temperature for a duration of about 4 to about 6 hours. Care should be exercised to assure that excessive sintering does not occur since the thermal conductivity and the density increase sharply with increased sintering. Properties of the insulation prepared by the method of the present invention include a density in the range of about 20–25 p.c.f. and a K factor of less than 0.5 B.t.u.-in./ft.$^2$-hr.-° F. at 1500° C.

In order to provide a more facile understanding of the present invention, a typical operation of preparing a shaped thermal insulator is set forth below.

EXAMPLE

A mixture of 32.2 g. of silicon oxide of a size of about 100 to 150 angstroms, 7.9 g. of titanium oxide of −325 mesh, and 4.5 g. of ½-inch-long, 10-mil-diameter silicon oxide fibers is thoroughly blended. The blended particulate mixture is added to 225 cc. of ethyl acetate and 75 cc. of octanoic acid. The mixture of the particulates and the wetting agents is slurried for about 5 minutes in a blender and then spread as a thin layer on an evaporating dish and dried in air at room temperature for 36 hours to remove most of the ethyl acetate and a portion of the octanoic acid. The dried mixture is again blended for 15 seconds to break up the larger flakes resulting from the drying. The ground or blended mixture is placed in a die-forming assembly and pressed at 3000 p.s.i. into the desired shape. The formed part is then slightly sintered at 900° C. for 6 hours. The sintered density of the product is 22.78 lbs./ft.$^3$. The thermal conductivity or K factor of the product is approximately 0.28, 0.32, and 0.40 B.t.u.-in./ft.$^2$-hr.-° F. at 700°, 1000°, and 1500° C., respectively.

While the oxide particulates or powder used in forming the insulator is preferably silicon oxide, other high melting oxides such as zirconium oxide, aluminum oxide, thorium oxide, and similar refractory oxides, all of about 100–150 angstroms particle size, may be satisfactorily employed in the prepartion of the insulator and exhibit similar thermal insulating properties. However, when employing oxide particulates other than silicon oxide the densities of the sintered product are greater than the values obtained with silicon oxide as described above, but the thermal insulating properties compare favorably. Similarly, this same relationship occurs when fibers other than silicon oxide fibers are used in the product.

It will be seen that the inorganic thermal insulation provided by the present invention represents a significant improvement in the insulating art since the insulation can be fabricated into relatively complex structures which are of sufficiently close tolerances to the prescribed final dimensions to eliminate or at least substantially minimize machining operations.

What is claimed is:

1. A method of fabricating an inorganic thermal insulation product of a preselected configuration, comprising the steps of mixing inorganic oxide particles in a size range of about 100 to 150 angstroms with a thixotropic-like system producing organic material in a gelatinous state and of a quantity adequate for wetting the surface of said particles with said organic material being selected from the group of fatty acids consisting of octanoic acid, heptanoic acid, and nonanoic acid, uniformly dispersing in said mixture a quantity of inorganic fibers adequate for maintaining the product in said configuration, drying the mixture while concurrently effecting the volatilization of all but a portion of the organic material, pressing the mixture with a stress sufficient to form said configuration with the organic material flowing during application of said stress for binding together and lubricating the particles, removing the stress, and thereafter sintering the pressed mixture in an inert atmosphere at a temperature adequate to lightly sinter the particles and volatilize virtually all of the organic material in the pressed mixture.

2. The method of fabricating an inorganic thermal insulation product as claimed in claim 1, including the additional step of admixing an organic liquid with said organic material and said particles for wetting the surface of the latter to reduce the volume and inhibit crystallization and hydration of the particles, said organic liquid being more volatile than said organic material, and wherein the drying of the mixture is at a temperature sufficient to volatilize at least virtually all of said organic liquid in the mixture.

3. The method of fabricating an inorganic thermal insulation product as claimed in claim 2, wherein the oxide particles are selected from the group of oxides consisting of silicon oxide, zirconium oxide, and thorium oxide, and wherein the inorganic fibers are selected from a group consisting of silicon oxide, zirconium oxide, asbestos, and aluminum oxide.

4. The method of fabricating an inorganic thermal insulation product as claimed in claim 3, wherein the organic liquid is selected from the group consisting of esters, ethers, and ketones.

5. The method of fabricating an inorganic thermal insulation product as claimed in claim 1, wherein the oxide particles are silicon oxide, and wherein the product has a density less than 25 pounds per cubic foot and a thermal conductivity factor less than 0.5 B.t.u.-in./ft.$^2$-in.-° F. at a temperature of 1500° C.

6. The method of fabricating an inorganic thermal insulation product as claimed in claim 5, wherein the inorganic fibers consist of silicon oxide of about 0.5 to 1.5 inches in length and of a diameter of about 10 mils, and wherein the fibers provide about 1 to 10 weight percent of the product.

7. The method of fabricating an inorganic thermal insulation product as claimed in claim 6, including the additional step of admixing titanium oxide powders in said mixture prior to the drying step.

8. The method of fabricating an inorganic thermal insulation product as claimed in claim 7, wherein the mixture is pressed with a stress of about 1000 to 3000 p.s.i., and wherein the sintering of the pressed mixture is provided at a temperature in the range of 800° to 900° C. for a duration of about 4 to 6 hours.

References Cited

UNITED STATES PATENTS

| 3,301,785 | 1/1967 | Ratliff et al. | 252—62 |
| 3,347,798 | 10/1967 | Baer et al. | 264—44 X |
| 1,938,170 | 12/1933 | Bellamy | 264—44 |
| 2,121,018 | 6/1938 | Carter | 264—44 X |
| 3,510,323 | 5/1970 | Wismer et al. | 106—41 |

OTHER REFERENCES

Peck, Robert L.: "Improved Electroviscous Composition," Fr. 1,488,158, July 7, 1967, in Chemical Abstracts, vol. 68, 1968, No. 99,832 m.

PHILIP E. ANDERSON, Primary Examiner

U.S. Cl. X.R.

106—41, 243; 252—62; 264—125